(12) United States Patent
Thompson et al.

(10) Patent No.: US 6,897,178 B1
(45) Date of Patent: May 24, 2005

(54) CARBIDE/NITRIDE BASED FUEL PROCESSING CATALYSTS

(75) Inventors: Levi T. Thompson, Northville, MI (US); Shyamal K. Bej, Ann Arbor, MI (US); Jeremy J. Patt, League City, TX (US); Chang H. Kim, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 0 days.

(21) Appl. No.: 10/698,818

(22) Filed: Oct. 31, 2003

(51) Int. Cl.$^7$ .......................... B01J 27/22; B01J 27/224; B01J 27/24; B01J 23/00
(52) U.S. Cl. ........................ 502/185; 502/177; 502/178; 502/200; 502/313; 502/325
(58) Field of Search ................................ 502/177, 178, 502/200, 313, 325, 185

(56) References Cited

U.S. PATENT DOCUMENTS

| | | | | |
|---|---|---|---|---|
| 4,414,182 A | * | 11/1983 | Okamoto et al. | ........... 423/652 |
| 5,338,716 A | * | 8/1994 | Triplett et al. | ................. 502/64 |
| 5,680,292 A | * | 10/1997 | Thompson et al. | ......... 361/528 |
| 5,837,630 A | * | 11/1998 | Owens et al. | .................. 501/80 |
| 5,888,669 A | * | 3/1999 | Thompson et al. | .... 429/231.95 |
| 6,297,185 B1 | * | 10/2001 | Thompson et al. | ......... 502/101 |
| 6,623,720 B2 | * | 9/2003 | Thompson et al. | ......... 423/656 |
| 2004/0146458 A1 | * | 7/2004 | Weissman et al. | .......... 423/651 |

OTHER PUBLICATIONS

Journal of Catalysis 112, p. 44–53 (1988), "Molybdenum Carbide Catalysts", J.S.Lee, L. Volpe, F. H. Ribeiro, M. Boudart, no month.
Journal of Catalysis 32, p. 304–314 (1974), "The Kinetics and Mechanism of Spillover", R. B. Levy, M. Boudart, no month.
Journal of Solid State Chemistry 118, p. 84–92 (1995), "Kinetics and Mechanism of Molybdenum (VI) Oxide Reduction", Jerzy Sloczynski, no month.
Journal of Catalysis 134, p. 383–398 (1992), "Compared Activities of Platinum and High Specific Surface Area $Mo_2C$ and WC Catalysts for Reforming Reactions", Marc J. Ledoux, Cuong Pham Huu, Jean Guille, Hugh Dunlop, no month.
Catalysis Letters 35 (1995) p. 353–360, "Novel Catalysts for Selective Dehalogenation of $CCl_2F_2$ (CFC12)", B. Dhandapani, S. T. Oyama, no month.
Journal of Catalysis 144, p. 38–49 (1993), "$CO_2$–Reforming of Methane Over Transition Metals", J. R. Rostrup–Nielsen, J–H. Bak Hansen, no month.
Chem. –Ing. –Tech. 69, p. 83–87 (1997), "Rhodium auf Wolframcarbid—ein neuer Katalysator zum Reformieren", J. Volter, H. Berndt, G. Lietz, H. Preiss, R. Tamme.
Journal of Catalysis 201, p. 206–212 (2001), "Activity and Stability of Molybdenum Carbide as a Catalyst for $CO_2$ Reforming", J. Sehested, C. J. H. Jacobsen, S. Rokni, J. R. Rostrup–Nielsen, no month.

* cited by examiner

*Primary Examiner*—David Sample
*Assistant Examiner*—Patricia L. Hailey
(74) *Attorney, Agent, or Firm*—Harness, Dickey & Pierce, P.L.C.

(57) ABSTRACT

Catalysts for the water gas shift reaction contain a variety of late transition metals. The catalytic compositions contain a late transition metal carried on a support which is a carbide, nitride, or mixed carbide nitride of a group 6 metal such as molybdenum, tungsten, and mixtures thereof. The late transition metal includes ruthenium, cobalt, nickel, palladium, platinum, copper, silver, or gold. The water gas shift reaction may be catalyzed by contacting a gaseous stream containing carbon monoxide and water with such a solid catalyst composition. In some embodiments, the catalysts are several times more active than known commercial catalysts for the water gas shift reaction.

21 Claims, No Drawings

CARBIDE/NITRIDE BASED FUEL PROCESSING CATALYSTS

FIELD OF THE INVENTION

This invention relates to catalysts for the water gas shift reaction. In particular, the invention relates to transition metals carried on group 6 carbides and nitrides.

BACKGROUND OF THE INVENTION

Hydrogen gas has a number of important industrial applications including in petroleum refining, powering fuel cells, in production and processing of chemicals, and in semiconductor materials manufacture. The earth's supply of hydrogen does not exist as large deposits of hydrogen gas, but is carried on other widely available molecules such as water or as hydrocarbons from petroleum oil or coal. As a result, hydrogen gas for use in the industrial application mentioned above is usually produced from water and hydrocarbon starting materials with a series of catalytic steps which generally provide hydrogen gas along with by products including oxygen, carbon monoxide and carbon dioxide.

In one important industrial process for the production of hydrogen, a hydrocarbon such as methanol, natural gas, gasoline, or diesel fuel is converted in a series of steps into a hydrogen rich gas. In an initial reaction such as steam reforming or partial oxidation, a hydrocarbon is reacted with water or oxygen to form hydrogen gas along with other by-products consisting mainly of carbon monoxide and carbon dioxide. The carbon monoxide produced in the initial reaction may be further reacted with water to yield additional amounts of hydrogen. The water gas shift reaction is the name given to the reaction of carbon monoxide, produced for example in the reforming process, with water to form hydrogen and carbon dioxide. Thus, the water gas shift reaction is a key reaction in the conversion of hydrocarbons into a hydrogen rich gas. Not only does the water gas shift reaction function to increase the yield of hydrogen from the process, it also may be valuable for removing undesired carbon monoxide from the reaction stream.

The water gas shift reaction, as are other reactions in the production of hydrogen from hydrocarbons, is generally carried out by passing a gas stream containing reactants over a solid catalyst in a heterogeneous reaction. The rate of conversion of the reactant into hydrogen and the overall yield of hydrogen is dependent on the function and the nature of the catalyst used. In addition, the size, weight, and cost of systems used to generate hydrogen depend on the efficiency of the catalyst for the water gas shift reaction and for other reactions in the overall process. Efficient catalysts for the water gas shift reaction would therefore be desirable because by using such catalysts the sizes of the systems used to produce hydrogen gas can be decreased and/or the rate of hydrogen production from such systems could be increased.

SUMMARY OF THE INVENTION

Catalysts for the water gas shift reaction contain a variety of transition metals. The catalytic compositions contain a late transition metal carried on a support. The support contains a carbide, nitride, or mixed carbide nitride of molybdenum. The late transition metal carried on the carbide or nitride support includes ruthenium, cobalt, nickel, palladium, platinum, copper, silver and gold. The water gas shift reaction may be catalyzed by contacting a gaseous stream containing carbon monoxide and water with such a solid catalyst composition. In preferred embodiments, the catalysts are several times more active than known commercial catalysts for the water gas shift reaction.

The catalysts may be synthesized by bringing a solid group 6 metal carbide or nitride into contact with an aqueous solution of a late transition metal, separating the solids from the resulting supernatant, drying the solids, and heating the solids to a temperature suitable for producing the catalyst composition containing the late transition metal supported on the group 6 carbide or nitride. The method for synthesizing the catalytic composition may further contain the step of passivating the composition by exposing it to oxygen.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF PREFERRED EMBODIMENTS OF THE INVENTION

The following description of the preferred embodiment(s) is merely exemplary in nature and is in no way intended to limit the invention, its application, or uses.

In one embodiment, the catalytic composition contains a late transition metal held upon a support wherein the support comprises a material of formula, $MO_a W_{2-a} C_b N_{1-b}$ wherein $0 < a \leq 2$ and $0 \leq b \leq 1$. The late transition metal is selected from the group consisting of Ru, Co, Ni, Pd, Pt, Cu, Ag, and Au. Preferred support materials include molybdenum carbide and molybdenum nitride. Preferred late transition metals include platinum, nickel, and gold. The catalytic compositions contain an amount of late transition metal suitable for making a catalytic composition that catalyzes the water gas shift reaction at a useful rate. In some embodiments, the catalytic composition contains 0.1 to 10 percent weight percent of the late transition metal, preferably 0.5 to 5 percent by weight and more preferably 1 to 4 percent by weight of the late transition metal.

In other embodiments, the catalytic composition comprises a late transition metal carried on a support wherein the support is a carbide or nitride of a group 6 metal including molybdenum, and the late transition metal is selected from the group consisting of Ru, Co, Ni, Pd, Pt, Cu, Ag, and Au. Preferably, the catalytic composition comprises 0.1 to 10% by weight of the late transition metal.

In another embodiment, the invention provides a method for carrying out a water gas shift reaction. To carry out the reaction, a gaseous stream containing carbon monoxide and water is contacted with or passed over a solid catalyst composition such as described above. The catalyst composition contains a late transition metal supported or carried on a carbide or nitride of molybdenum or a mixture of molybdenum and tungsten. The catalyst may be further diluted with non-reactive carriers such as silica.

In a preferred embodiment, the water gas shift reaction using the catalytic compositions of the invention is carried out at a temperature of from 200–240° C.

In one embodiment, the catalytic compositions of the invention are prepared by an adsorption method. In this method, a solid group 6 metal carbide or nitride is brought into contact with an aqueous solution of a late transition metal to form a system comprising solids and a supernatant. In a second step, the solids are separated from the supernatant and the solids are thereafter dried. After drying, the solids may be heated above about 200° C. to produce a catalyst composition made up of the late transition metals supported on the group 6 metal carbide or nitride. Molybdenum is the preferred group 6 metal.

In a variant called the deposition precipitation method, the pH of the supernatant in the method above is raised before the solids are separated from the supernatant. In one embodiment, the pH may be raised by adding carbonate salts to the supernatant.

In either variant of the synthesis method, after the solids are separated from the supernatant and dried, the solids are heated to a temperature sufficient to prepare the catalytic composition. The heating step is believed to be essentially a calcining step in which volatile components are released and the transition metal in a simple form such as an oxide is bound on to the surface of the supporting nitride or carbide particles. In one embodiment, the solids are heated to a temperature of at least 200° C. to produce the catalyst compositions. In a preferred embodiment, the solids are heated above 400° C. for a time sufficient to form the catalyst composition.

The drying step is preferably carried out at a lower temperature than the final calcining temperature. In general any temperature above room temperature is preferred to remove water and other volatile materials from the solids. It is preferred to dry the solids at the boiling point of water or slightly higher for one or two hours before heating to the higher temperatures necessary to accomplish the final calcining or catalyst preparation step. If desired, the drying and calcining may be accomplished in a single step. For example if the solids are exposed immediately after separation to temperatures above 200° C., the drying or the driving off of water will naturally occur along with the other reactions. Alternatively, the separated solids may be placed in a temperature programmed oven. As the temperature steps through temperatures below and slightly above the boiling point of water, the water will be removed from the solids in a first step. As the temperature rises further through the step programming, a final calcining temperature will be eventually be reached at which the synthesis of the catalytic composition may be completed.

The drying and calcining steps are carried out for time sufficient to accomplish their purpose. Generally, the time needed for the reaction depends on a number of factors, including the atmosphere in which the reactions are carried out, the scale of reaction, and other factors. As a general rule, drying may be accomplished in a matter of one or two hours, and the final high temperature reaction may be carried out for a period of 30 minutes up to 10 hours, preferably about 1 hour to about 5 hours. Further non-limiting examples of the times needed to prepare the catalytic compositions of the invention are given in the examples below.

The carbides and nitrides of molybdenum and tungsten may be obtained commercially or may be synthesized directly from molybdenum- and tungsten-containing starting materials. In some embodiments, the starting materials of synthesis contain only molybdenum. In these cases, a relatively pure molybdenum carbide or nitride may be synthesized. By combining starting materials that contain both molybdenum and tungsten, and alternatively both a source of carbon and a source of nitrogen as further discussed below, mixed molybdenum/tungsten carbide/nitrides may be produced. The stoichiometry of the mixed molybdenum/tungsten carbide/nitride thus produced will naturally depend on the relative amounts of the reactants used as starting materials.

In one embodiment, the carbides and nitrides may be synthesized using a temperature programmed reaction method. For the synthesis of molybdenum carbide and molybdenum nitride, for example, a quantity of molybdenum containing starting material such as ammonium paramolybdate may be loaded on a quartz wool plug located inside a quartz reactor. Typical quartz reactors have an inner diameter of about 15 mm. For the synthesis of tungsten carbide or tungsten nitride, on the other hand, starting materials containing tungsten, such as without limitation tungsten trioxide may be used for the synthesis.

To accomplish the synthesis, the reactor is placed inside a furnace. A gas mixture is passed through the reactor to accomplish the synthesis of the carbide or nitride. For example, to synthesize the carbide a mixture of methane and hydrogen may be passed through the reactor. For the synthesis of the nitride, ammonia gas may be passed through the reactor. The temperature of the reactor may be measured and controlled using a thermocouple placed above the oxide bed and controlled using a temperature controller connected to the furnace. The reactor may be heated linearly and then soaked at the final temperature for times sufficient to accomplish the synthesis, typically 1–2 hours. The time to accomplish the synthesis and therefore the temperature program may be determined from thermogravometric analysis, wherein the reaction is carried out until no further weight change is detected. After the synthesis is complete the reactor may be quickly cooled back down to room temperature. The particle size is typically similar to that of the precursor. It is also possible to manipulate the particle size by adjusting the heating rate and reactant flow rate, or by grinding then sieving the materials in a controlled environment.

An adsorption method may be used to load transition metals such as Pt, Pd, Ag, Ru, Au, Ni, Cu, and Co on to the carbide and nitride supports. In the adsorption method, an appropriate amount of a suitable metal compound is dissolved in a quantity of water. In a preferred embodiment, an inert gas such as argon is constantly bubbled through the solution to remove dissolved oxygen. A carbide, nitride, or mixed carbide nitride support such as described above is carefully transferred from the synthesis reactor and added to the solution without exposure to air. Thereafter, the mixture may be kept at ambient temperature and then heated slightly with occasional stirring. It is preferred to maintain a flow of inert gas throughout the entire process. After stirring for a time, the solid is allowed to settle. The supernatant liquid may be discarded and the solid material collected, for example on a filter. Next, the solid material is dried for a time sufficient to remove water from the solid material. In one embodiment, the solid material may be loaded on a quartz wool plug in a quartz reactor using a helium atmosphere. The material may be dried for example at 110° C. for 2 hours under a hydrogen flow, typically at about 250 ml per minute. The material may be further reduced at an elevated temperature such as about 450° C. for a time such as 4 hours. After reduction, the material may be cooled to an ambient temperature and then passivated by passing the mixture of 1% oxygen and the balance helium over the material for about 4 hours at room temperature (given a gas flow of 20 ml per minute).

Suitable late transition metal compounds include any that are soluble in water to an extent needed for reaction. In general, chlorides and nitrates of the late transition metals are readily available which have sufficient solubility. Non-limiting examples of soluble late transition metal compounds include materials $H_2PtCl_6 \cdot 6H_2O$; $RuCl_3$; $PdCl_2$;

$AgNO_3$; $HAuCl_4 \cdot 3H_2O$; $Ni(NO_3)_2 \cdot 6H_2O$; $Cu(NO_3)_2 \cdot 3H_2O$; and $Co(NO_3)_2 \cdot 6H_2O$.

A deposition precipitation method may also be used to prepare catalytic compositions of the invention. Many of the steps are similar to the steps of the adsorption method. In one key difference, the pH of the supernatant solution is raised while the late transition metal solution is in contact with the molybdenum/tungsten nitride/carbide. In one embodiment, a molybdenum/tungsten carbide/nitride carrier is transferred into de-aerated water without exposure to air. While the carrier is suspended by vigorous stirring, a basic solution is added to raise the pH, preferably to approximately 9.5. Thereafter an appropriate amount of a solution of a late transition metal compound in de-aerated water may be slowly added to the carrier suspension. It is preferred to maintain the pH of the suspension at about 9.5 by adding more of the basic solution as necessary. Conveniently, the pH raising basic solution may contain a carbonate such as sodium carbonate. After addition of the late transition metal compound is complete the system is maintained at slightly elevated temperature for a period of time such as one or two hours, while maintaining the pH at about 9.5. Thereafter the solid may be allowed to settle out, collected on a filter, and washed with water. The washed solids may be transferred to a reactor and dried and reduced as described above for the adsorption method.

The water gas shift reaction is carried out by passing a gas containing carbon monoxide and hydrogen through a reaction chamber or otherwise over a catalyst composition according to the invention. Methods and conditions for carrying out the water gas shift reaction are well known, such as those used with commercial catalysts such as Cu—Zn—Al from Sud-Chemie or supported catalysts such as a 1% $Pt/Al_2O_3$ material commercially available from Alfa. Conveniently, the active catalyst composition may be diluted in the reactor with a non-reacting or inert carrier such as silica. The temperature of reaction is selected according to a number of variables, such as the composition of the gas input stream, the size of the reactor, the throughput or reaction rate desired, and other factors. A typical temperature of reaction for commercial is approximately 200° C. Naturally, higher temperatures may be used at which it would be expected that the reaction would proceed faster, but with the possible disadvantage of higher costs such as energy and high temperature materials. Alternatively, lower temperatures may be used, however it is to be appreciated that at a low enough temperature, the reaction would no longer be commercially viable because of unfavorable kinetics or the presence of unwanted or un-reacted by-products. Further non-limiting conditions and parameters of the water gas shift reaction are given in the examples. The invention has been described above with respect to various preferred embodiments. Further non-limiting examples of embodiments of the invention are given in the examples that follow:

EXAMPLE 1

Synthesis of Molybdenum Carbide and Tungsten Carbide

About 1.5 grams of ammonium paramolybdate is loaded over a quartz wool plug located inside a quartz reactor (id=15 mm). A mixture of 15% methane and the balance hydrogen is passed through the reactor. The temperature of the reactor is measured using a thermocouple (K-type) placed just above the oxide bed and controlled using temperature controller Omega-CN-2010 connected to the furnace. The reactor is heated linearly and then soaked at the final temperature for about 1–2 hours. The temperature program is determined from thermogravimetric analysis conducted using a Cahn TG-171. After the synthesis is complete the reactor is quickly cooled down to room temperature. The temperature was increased from ambient to approximately 200–300° C. in approximately 30 minutes then slowly increased at 1° C./min to the final temperature. The final temperature was between 500–700° C., depending on the material. This temperature was typically maintained for 2 hours.

For synthesis of tungsten carbide, 1.5 g of $WO_3$ may be substituted for the ammonium paramolybdate above.

EXAMPLE 2

Synthesis of Molybdenum Nitride and Tungsten Nitride

The synthesis of the nitrides of molybdenum or tungsten may be accomplished according to the method of Example 1, except that instead of methane and hydrogen, a gas containing ammonia is passed through the reactor. Typically pure ammonia is used.

EXAMPLE 3

Adsorption Method for Catalyst Synthesis

An appropriate amount of a suitable metal compound such as $H_2PtCl_6 \cdot 6H_2O$; $RuCl_3$; $PdCl_2$; $AgNO_3$; $HAuCl_4 \cdot 3H_2O$; $Ni(NO_3)_2 \cdot 6H_2O$; $Cu(NO_3)_2 \cdot 3H_2O$; and $Co(NO_3)_2 \cdot 6H_2O$ is dissolved in approximately 70 ml of water. Argon is constantly bubbled through the solution to remove dissolved oxygen. A carbide or nitride such as prepared in Examples 1 or 2 is carefully transferred and added to the solution without exposing it to air. The mixture is kept at ambient temperature for 2 hours and then at 40° C. for 1 hour with occasional stirring. Argon flow is continued through the entire process. The mixture is then cooled to ambient temperature and the solid allowed to settle. The supernatant liquid is discarded. The solid material is loaded on a quartz wool plug in a quartz reactor under a helium atmosphere. The quartz reactor is then placed in a furnace. The material is dried at 110° C. for 2 hours under a hydrogen flow. (250 ml/minute) and reduced at 450° C. for 4 hours. After reduction, the material is cooled to ambient temperature. The material is then passivated by passing a mixture of 1% oxygen and balance helium (20 ml/min) for 4 hours at room temperatures.

The amount of metal compound used is chosen to provide a carried catalyst containing preferably 0.1% to 10% by weight of the late transition compound, based on the entire weight of the catalyst. For example, 0.0456 g of $H_2PtCl_6 \cdot 6H_2O$ was used to prepare a catalyst containing 2% Pt on a $Mo_2C$ support. The support typically has a surface area of 60 $m^2/g$.

EXAMPLE 4

Deposition-Precipitation Method

Approximately 100 ml of water was de-aerated by bubbling argon through it. A support material such as $Mo_2C$ is carefully transferred to the de-aerated water without exposure to air. The $Mo_2C$ is suspended in water with vigorous stirring. A solution containing 1.5 g of sodium carbonate and 150 mL of de-aerated water is prepared and added to the molybdenum carbide suspension until the pH is increased to approximately 9.5. An appropriate amount of $HAuCl_4 \cdot 3H_2O$ is dissolved in 30 to 60 mL of de-aerated water and then slowly added to the molybdenum carbide suspension. During this period, the pH of the suspension is maintained at about 9.5 by adding more of the sodium carbonate solution as needed. After addition of the gold solution, the temperature of the suspension is increased from ambient to about 55°

C. and held for about 1 hour. The temperature is then increased further to 70° C. After maintaining the material at 70° C. for 1 hour, the suspension was cooled to room temperature. The pH of the suspension is maintained at approximately 9.5 during the entire period. The solid is then allowed to settle out. The solid is collected and washed three times using approximately 200 mL of de-aerated water each time. All these operations are conducted under an argon atmosphere. After washing, an appropriate amount of the wet material is transferred to the reactor under an argon atmosphere. Before measuring the catalytic activity, the material is dried in the reactor at 110° C. for 2 hours under flowing hydrogen and then reduced at 250–300° C. for 4 hours.

EXAMPLE 5

Water Gas Shift Rates

The reactant gas stream contained 5.7 weight percent CO and 38.6 weight percent hydrogen in addition to 15.9% nitrogen, 6.3% $CO_2$, and 30% deionized water ($H_2O$). All gas components were 99.5% or higher. The deionized water had a conductivity of 18.2 MΩ cm at 25° C. The gas stream simulates exhaust products from the partial oxidation of gasoline. The gases were delivered by mass flow controllers, while water was added by bubbling the dry gas mixture through a heated saturator vessel. The gas lines were heated to 120° C. between the saturator and the catalyst bed to prevent condensation. Carbonyls were removed from the stream containing carbon monoxide by passing through a bed of alumina (Sud-Chemie CS-232).

Catalyst (25–150 mg) is loaded onto a quartz wool plug that is packed in a 4 mm ID quartz tube. The catalyst is diluted with silica (Alfa, 99.995%, <1 $m^2/g$,-60+120 mesh) to obtain a bed volume of 0.125 $cm^3$. The reactor tube is heated by furnace with PID temperature control. A K-type thermocouple (1/16 inch diameter Alloy 600 sheath) contacted the top of the catalyst bed. Carbide and nitride catalysts are pretreated in hydrogen or in a mixture of 15% methane in hydrogen for 4 hours at a temperature selected between 400 and 590° C. Rates are measured at temperatures up to 240° C. at atmospheric pressure. An SRI Model 8610C gas chromatograph equipped with a Carboxen 1000 column and a thermal conductivity detector was used to determine the effluent composition. A condenser was placed upstream of the gas chromatograph to reduce the dew point to 0° C. A blank contained silica (0.125 $cm^3$) that was not active in catalyzing the water gas shift reaction.

Reaction rates approached steady state after approximately 3 hours on-stream and were reproducible to within 10% during subsequent runs. There was no evidence of methane formation for the catalysts under the conditions employed. The CO conversion ranged from 2 to 30%.

EXAMPLES 6–22

Various supported late transition metal catalysts were prepared by the adsorption method or by the deposition precipitation method. The catalyst composition, the surface area of the catalyst, the pre-treatment conditions of the catalyst, the reaction rates at 210° C.–240° C. and the activation energy calculated from the rates of reaction at the various temperatures are reported in the tables for Examples 6–22.

| | Example 6 | Example 7 | | Example 8 | | Example 9 | | Example 10 |
|---|---|---|---|---|---|---|---|---|
| | | | | Catalyst | | | | |
| | $Mo_2C$ | 2% Pt/$Mo_2C$ | | $Mo_2C$ | | 4% Pt/$Mo_2C$ | | 3% Cu/$Mo_2C$ |
| | | | | Surface Area ($m^2/g$) | | | | |
| | 60 | 60 | | 135 | | 135 | | 60 |
| Pretreatment | $H_2$ 450° C. | 15% $CH_4$ 590° C. | $H_2$ 450° C. | 15% $CH_4$ 450° C. | $H_2$ 450° C. | 15% $CH_4$ 450° C. | $H_2$ 450° C. | 15% $CH_4$ 450° C. | 15% $CH_4$ 325° C. |
| Rxn. Rate (µmol/s/g) at: | | | | | | | | | |
| 240° C. | 3.1 | 7.5 | 37.9 | 61.2 | 4.3 | 9.8 | 65.1 | 151.2 | 3.9 |
| 230° C. | 2.7 | 5.6 | 31.5 | 52.2 | 4.0 | 8.3 | 64.3 | 147.5 | 2.9 |
| 220° C. | 1.8 | 4.0 | 25.2 | 38.0 | 2.5 | 5.5 | 45.3 | 106.6 | 2.5 |
| 210° C. | 1.4 | 2.6 | 20.9 | 32.0 | 1.9 | 3.7 | 39.7 | 93.3 | 2.1 |
| Activation Energy (kcal/mol) | 14.1 | 17.1 | 9.7 | 11.5 | 15.1 | 16.4 | 9.4 | 10.3 | 12.4 |

| | Example 11 | Example 12 | Example 13 | | Example 14 | Example 15 | Example 16 | Example 17 |
|---|---|---|---|---|---|---|---|---|
| | | | | | Catalyst | | | |
| | 1% Ni/$Mo_2C$ | 1% Co/$Mo_2C$ | 2% Ru/$Mo_2C$ | | 4% Pd/$Mo_2C$ | 4% Ag/$Mo_2C$ | 4% Au/$Mo_2C$ | 2% Pt/$Mo_2C$ |
| | | | | | Surface Area ($m^2/g$) | | | |
| | 60 | 60 | 60 | | 61 | 135 | 135 | 60 |
| Pretreatment | 15% $CH_4$ 450° C. | 15% $CH_4$ 450° C. | $H_2$ 450° C. | 15% $CH_4$ 450° C. | 15% $CH_4$ 450° C. | 15% $CH_4$ 450° C. | 15% $CH_4$ 350° C. | 15% $CH_4$ 450° C. |
| Rxn. Rate (µmol/s/g) at: | | | | | | | | |
| 240° C. | 20.6 | 7.7 | 8.4 | 7.5 | 20.4 | 6.7 | 3.5 | 61.2 |
| 230° C. | 15.7 | 7.1 | 6.2 | 6.1 | 12.6 | 5.4 | 2.6 | 52.2 |

-continued

| | | | | | | | | |
|---|---|---|---|---|---|---|---|---|
| 220° C. | 10.5 | 4.8 | 5.1 | 4.2 | 9.0 | 4.2 | 1.8 | 38.0 |
| 210° C. | 7.9 | 4.0 | 3.8 | 3.1 | 6.6 | 3.1 | 0.8 | 32.0 |
| Activation Energy (kcal/mol) | 16.5 | 13.2 | 12.6 | 15.0 | 15.9 | 15.9 | 27.0 | 11.5 |

| | Example 18 | Example 19 | | | | Example 20 | Example 21 | Example 22 |
|---|---|---|---|---|---|---|---|---|
| | | | | Catalyst | | | | |
| | 2% Pt/W$_2$C | 4% Pt/Mo$_2$N | | | | 4% Pd/Mo$_2$C | 2% Au/Mo$_2$C | 4% Au/Mo$_2$C |
| | | | | Surface Area (m$^2$/g) | | | | |
| | 40 | 140 | | | | 61 | 60 | 135 |
| Pretreatment | 15% CH$_4$ 450° C. | H$_2$ 450° C. | 15% CH$_4$ 450° C. | 15% CH$_4$ 590° C. | NH$_3$ 450° C. | 15% CH$_4$ 450° C. | H$_2$, 300° C. | 15% CH$_4$ 590° C. |
| Rxn. Rate ($\mu$mol/s/g) at: | | | | | | | | |
| 240° C. | 0 | 74.0 | 125.8 | 175.9 | 60.9 | 56.1 | 16.4 | 19.7 |
| 230° C. | 0 | 70.7 | 133.3 | 182.3 | 55.1 | 30.6 | 13.9 | 15.3 |
| 220° C. | 0 | 53.3 | 101.5 | 131.3 | 42.6 | 19.6 | 6.0 | 7.7 |
| 210° C. | 0 | 45.4 | 89.5 | 111.3 | 37.4 | 14.6 | 5.3 | 6.5 |
| Activation Energy (kcal/mol) | | 9.5 | 7.7 | 10.1 | 8.5 | 17.3 | 15.0 | 13.9 |

The catalyst of Examples 6–20 were prepared using the adsorption method of Example 3, while the catalyst of Examples 21 and 22 were prepared using the deposition precipitation method of Example 4.

A composition carried on a group 6 metal consisting entirely of tungsten (Example 18) was inactive while the corresponding Mo-containing composition was active (Example 17). The Pt/Mo$_2$C and Pt/Mo$_2$N catalyst prepared using the adsorption method yielded higher reaction rates than the parent Mo$_2$C and Mo$_2$N, respectively. See for example, Examples 1–4, 17, and 19–20. The parent Mo$_2$N was essentially inactive. Similarly, the 1% Ni/Mo$_2$C catalyst (initial surface area of 60 m$^2$/g) prepared using the adsorption method was more active than Mo$_2$C. See for example, Examples 6 and 11.

An effect of late transition metal loading and surface area can be seen by comparing Examples 7 and 9. Example 9, having a higher loading of platinum and a higher surface area than Example 7, shows higher reaction rates.

It may also be seen that Au/Mo$_2$C catalyst prepared using the deposition precipitation method (Example 22) had a higher activity than Au/Mo$_2$C catalyst prepared using the adsorption method (Example 16) and had a higher activity than the parent Mo$_2$C compound (Example 8).

Catalysts with 4% Pt carried either on Mo$_2$C (Example 9) or Mo$_2$N (Example 19) yield reaction rates that are higher than those for a commercial Cu/Zn/Al catalyst under the same conditions.

Catalysts pretreated with a mixture of 15% methane and the balance hydrogen were, in general, more active (i.e., produced higher reaction rates) than catalysts prepared with pretreatment in pure hydrogen. The effect may be seen for the late transition metal supported catalysts (for example, Examples 7, 8, 9, 19, and 20), as well as for molybdenum carbide itself (for example, Examples 6 and 8). However, the effect was not observed for the 2% ruthenium supported on the molybdenum carbide catalyst (Example 13).

What is claimed is:

1. A catalyst composition comprising a late transition metal held upon a support, wherein:

the late transition metal is selected from the group consisting of Ru, Co, Ni, Pd, Pt, Cu, Ag and Au, the support comprises a material of formula MO$_a$W$_{2-a}$C$_b$N$_{1-b}$ wherein 0<a≦2 and 0≦b≦1; and the transition metal is loaded onto the support without exposing the support to air.

2. A composition according to claim 1, wherein the support comprises molybdenum carbide.

3. A composition according to claim 1, wherein the support comprises molybdenum nitride.

4. A composition according to claim 1, wherein the late transition metal comprises platinum.

5. A composition according to claim 1, wherein the late transition metal comprises nickel.

6. A composition according to claim 1, wherein the late transition metal comprises gold.

7. A composition according to claim 1, wherein the catalytic composition comprises 0.1–10% by weight of the late transition metal.

8. A composition according to claim 7, comprising 0.5–5% by weight of the late transition metal.

9. A composition according to claim 7, comprising 1.04% by weight of the late transition metal.

10. A catalyst composition comprising a late transition metal carried on a support, wherein the transition metal is selected from the group consisting of Ru, Co, Ni, Pd, Pt, Cu, Ag and Au;

the support comprises molybdenum carbide or molybdenum nitride;

the catalyst composition comprises 0.1–10% by weight of the transition metal; and the transition metal is loaded on to the support without exposure of the support to air.

11. A composition according to claim 10, wherein the support comprises molybdenum carbide.

12. A composition according to claim 10, wherein the support comprises molybdenum nitride.

13. A composition according to claim 10, wherein the transition metal is selected from the group consisting of platinum, nickel and gold.

14. A method of preparing a supported transition metal composition comprising the steps of:
- bringing an unpassivated solid group 6 metal carbide or nitride into contact with an aqueous solution of a late transition metal without exposing the group 6 metal carbide or nitride to air to form a system comprising solids and the supernatant;
- separating the solids from the supernatant;
- drying the solids; and
- heating the solids above 200° C. to produce a catalyst composition comprising the late transition metal on the group 6 metal carbide or nitride, wherein the group 6 metal comprises molybdenum or tungsten and the late transition metal comprises Ru, Co, Ni, Pd, Pt, Cu, Ag, or Au.

15. A method according to claim 14, further comprising raising the pH of the supernatant while in contact with the solids.

16. A method according to claim 15, wherein raising the pH of the supernatant comprises adding carbonate salts.

17. A method according to claim 14, wherein the group 6 metal carbide or nitride comprises molybdenum carbide.

18. A method according to claim 14, wherein the late transition metal comprises platinum, nickel or gold.

19. A method according to claim 14, comprising heating the solids above 400° C.

20. A method according to claim 14, further comprising passivating the composition by exposing it to oxygen after the heating step.

21. A method according to claim 14, wherein all of the steps are carried out in the absence of oxygen.

* * * * *